C. R. GORGAS.
Churn.
No. 42,939.
Patented May 31, 1864.
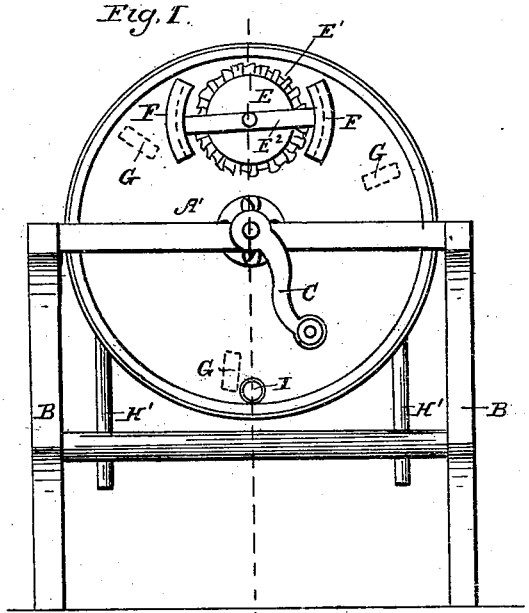
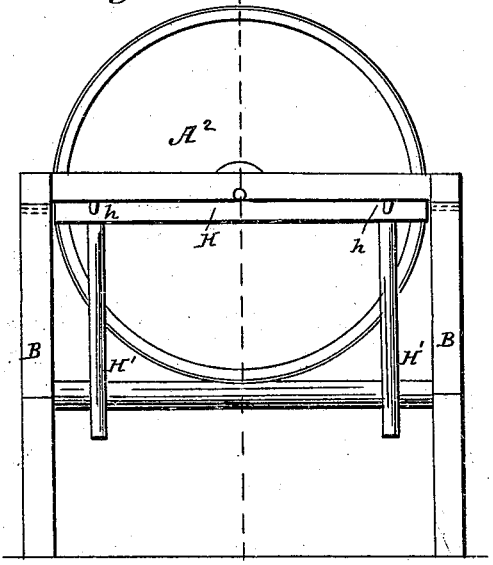
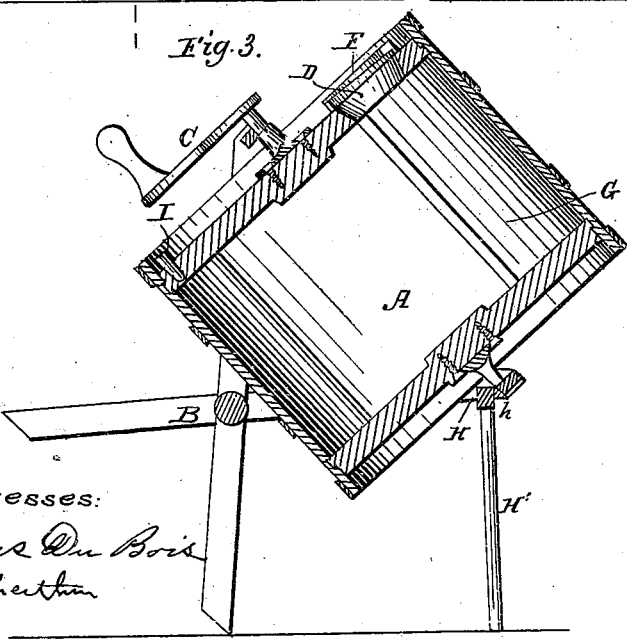

UNITED STATES PATENT OFFICE.

CHARLES R. GORGAS, OF WOOSTER, OHIO.

IMPROVEMENT IN CHURNS.

Specification forming part of Letters Patent No. 42,939, dated May 31, 1864.

*To all whom it may concern:*

Be it known that I, CHARLES R. GORGAS, of Wooster, in the county of Wayne and State of Ohio, have invented certain new and useful Improvements in Churns; and I do hereby declare the following to be a full and exact description of the same, reference being had to the accompanying drawings, making part of this specification, in which—

Figure 1 is afront end elevation of my improved churn. Fig. 2 is a rear end elevation of the same. Fig. 3 is a vertical longitudinal section thereof when in position to receive the milk or cream.

Similar letters of reference indicate corresponding parts in the several figures.

The objects of this invention are to produce a churn by which the cream may be more quickly and effectually converted into butter, and to provide means for facilitating the introduction of cream within the churn, as will be hereinafter more fully explained.

In order that others skilled in the art to which my invention appertains may be enabled to fully understand and use the same, I will proceed to describe its construction and operation.

In the accompanying drawings, A may represent the churn proper, which is of cylindrical form, and mounted within a frame, B, and adapted to be rotated therein by the crank-handle C. D represents an aperture or opening made in the head A' of the churn A for the introduction of the cream or milk. This aperture D is closed when the churn has been supplied with milk by means of a plug or stopper, E, and the joint between said aperture and stopper may be effectually closed by a cloth, E', which fits snugly over the inserted end of the plug E, and is designed to be inserted or removed simultaneously therewith. $E^2$ represents a bar pivoted at $e$ to the plug E, and adapted to retain said plug within the aperture D by having its respective ends turned into suitable oblique grooves, $f$, formed in the segmental projections F.

G G represent parallel bars or beaters, of which there are three contained within the churn A, and secured at their respective ends to the heads A' $A^2$ of the same without the intervention of screws, nails, or other metallic fastenings. These bars G occupy equidistant positions and constitute dashers, which are placed about one inch from the inner surface of the churn A, the effect of which arrangement is to promote the churning operation by subjecting the cream to the increased friction attending its forced passage through the spaces between the bars and the churn while the latter is being rotated, and also to adapt the butter to be collected into neat rolls.

H' H' represent arms, which are rigidly affixed to a bar, H, this bar H being pivoted at each end to the frame B, so as to allow the arms H' H' to be turned back for the purpose of supplying the place of legs when the churn is tilted in the manner shown in Fig. 3. The object in thus tilting the churn is to adapt it for the reception of a larger supply of cream by placing the aperture D in a nearly-horizontal position when any desired quantity of cream may be readily poured into the churn A from the vessels in which it may be contained. Any more than the requisite turning of the bar H upon its pivots is prevented by pins or projections $h$ $h$.

The buttermilk may be drawn off through an aperture in the head $A^2$, which is closed by a plug, I.

It is manifest that by locating the aperture D in the head or end of the churn in the manner above described the cream is rendered less liable to leak through than if it were formed in the circumference.

Having thus described my invention, the following is what I claim as new therein and desire to secure by Letters Patent:

1. In combination with the cylindrical churn A, the three bars G, the latter being adapted to revolve with the former, arranged in parallel and equidistant positions and located about one inch from the inner surface of the churn A, so as to operate in the manner set forth.

2. In a churn constructed and operating substantially as described, the aperture D in the head A', in combination with the plug E, bar $E^2$, and projections or catches F, as and for the purposes specified.

CHAS. R. GORGAS.

Witnesses:
W. W. HAMILTON,
DAVID HAMILTON.